United States Patent
Laurel, Jr.

(10) Patent No.: US 8,931,839 B1
(45) Date of Patent: *Jan. 13, 2015

(54) INFANT STIMULATION AND LEARNING APPARATUS

(71) Applicant: Roberto J. Laurel, Jr., San Antonio, TX (US)

(72) Inventor: Roberto J. Laurel, Jr., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,905

(22) Filed: Jul. 12, 2014

Related U.S. Application Data

(63) Continuation of application No. 14/261,351, filed on Apr. 24, 2014, now Pat. No. 8,777,311.

(51) Int. Cl.
*A47C 1/11* (2006.01)
*B60N 2/26* (2006.01)
*A47D 1/00* (2006.01)
*A47D 15/00* (2006.01)
*A47D 13/02* (2006.01)

(52) U.S. Cl.
CPC .............. *A47D 15/00* (2013.01); *A47D 13/025* (2013.01)
USPC ................ 297/256.15; 297/250.1; 297/217.3; 297/217.5

(58) Field of Classification Search
USPC ........... 297/250.1, 255, 256.15, 184.13, 464, 297/467, 217.3, 217.4, 217.5, 180.13; 345/419; 348/121
See application file for complete search history.

(56) References Cited

U.S. PATENT DOCUMENTS

| | | |
|---|---|---|
| 3,762,767 A | 10/1973 | Powell |
| 4,470,631 A | 9/1984 | Powell |
| 4,627,659 A | 12/1986 | Hall |
| D295,276 S | 4/1988 | Brown |
| 4,740,779 A * | 4/1988 | Cleary et al. ...................... 345/7 |
| 4,790,593 A | 12/1988 | Davalos |
| 4,826,245 A * | 5/1989 | Entratter .................... 297/217.5 |
| 5,083,837 A | 1/1992 | Roach |
| D335,965 S | 6/1993 | Spring |
| 5,232,263 A | 8/1993 | D'Ull et al. |
| 5,360,221 A | 11/1994 | Chai |
| D367,630 S | 3/1996 | McWayne |
| 5,624,156 A | 4/1997 | Leal |
| 5,662,379 A | 9/1997 | Zimelman |
| 5,716,095 A | 2/1998 | Lopez |
| 5,806,924 A | 9/1998 | Gonas |
| 6,702,374 B2 | 3/2004 | Kams |
| 7,463,161 B2 | 12/2008 | Griffin |
| 7,667,891 B2 * | 2/2010 | Cok et al. ...................... 359/443 |
| 7,938,731 B2 | 5/2011 | Papageorge |

(Continued)

*Primary Examiner* — David R Dunn
*Assistant Examiner* — Timothy J Brindley
(74) *Attorney, Agent, or Firm* — Wayne J. Colton, Inc.

(57) ABSTRACT

An infant stimulation and learning apparatus includes an isolation device and an environmental monitoring and control system. The isolation device is constructed as an infant carrier having an isolation canopy hingedly affixed thereto. The environmental monitoring and control system includes an audio-visual display system, media player, fresh air circulation system and infant monitoring system. A video screen, forming part of the audio-visual display system, is mounted to the interior surface of the isolation canopy. The fresh air circulation system includes a blower for conveying air into and through the interior space of the isolation device and a filter for removing particulate matter from the airflow prior to introduction to the isolation device. Means for securing the infant stimulation and learning apparatus in an automobile seat and an infant stroller and an infant restraint are provided. The infant monitoring system transmits video, sound and temperature to a remote location.

37 Claims, 14 Drawing Sheets

(56) References Cited

U.S. PATENT DOCUMENTS

| | | |
|---|---|---|
| 7,980,630 B2 | 7/2011 | Pos |
| 8,007,043 B1 | 8/2011 | Vuong |
| D645,264 S | 9/2011 | Wiegmann |
| 8,011,727 B1 | 9/2011 | Martinez |
| D655,113 S | 3/2012 | Wiegmann |
| 8,197,005 B2 | 6/2012 | Hopke |
| 8,239,984 B2 | 8/2012 | Hopke |
| 8,241,038 B2 * | 8/2012 | Quinn et al. .................. 434/38 |
| 8,358,317 B2 | 1/2013 | Carlson |
| 8,777,311 B1 | 7/2014 | Laurel |
| 2008/0136236 A1 | 6/2008 | Kincaid |
| 2012/0292964 A1 | 11/2012 | Heidt |

\* cited by examiner

INFANT STIMULATION AND LEARNING APPARATUS

RELATED APPLICATION

This present application claims, under 35 U.S.C. §120, priority to and all available benefit as a continuation of U.S. patent application Ser. No. 14/261,351 filed Apr. 24, 2014, now U.S. Pat. No. 8,777,311 B1 issued Jul. 15, 2014. By this reference, the full disclosure, including the claims and drawings, of U.S. patent application Ser. No. 14/261,351 is incorporated herein as though now set forth in its entirety.

FIELD OF THE INVENTION

The present invention relates to child development and learning. More particularly, the invention relates to an apparatus particularly adapted to enable presentation to an infant of selected media in an environment that isolates the infant from distractions while simultaneously ensuring that the infant is made maximally comfortable and remains under close caregiver supervision.

BACKGROUND OF THE INVENTION

Although research about the effects on child development of media exposure is in early stages, a number of observations are nonetheless surfacing. In particular, a consensus appears to be developing that a developing brain should not be over exposed to multitasking lest emotional and learning difficulties may result. On the other hand, focused and consistent exposure to appropriate media appears to enhance binocular vision and language skills.

With this very early knowledge in mind, it is therefore an overriding object of the present invention to provide an apparatus through which an infant may be provided with carefully controlled and extremely focused exposure to selected media. Additionally, it is an object of the present invention to provide such an apparatus that also ensures that the infant is made maximally comfortable in an environment that promotes a secure feeling. Still further, it is an object of the present invention to also provide such an apparatus that also enables a caregiver to closely monitor the infant in a manner that is not disruptive of the focused stimulation in order that the caregiver may intervene if needed without otherwise unnecessary interruption or compromise of a stimulation session. Finally, it is an object of the present invention to provide such an apparatus as also may be utilized in a multitude of environments, including in a nursery or like setting, in an automobile, in a stroller or virtually any other location.

SUMMARY OF THE INVENTION

In accordance with the foregoing objects, the present invention—an infant stimulation and learning apparatus—generally comprises a generally ovoid (or substantially equivalent) shaped isolation device, generally constructed as an infant carrier having an isolation canopy hingedly affixed thereto, and an environmental monitoring and control system. The infant carrier comprises an infant seat adapted to support an infant in a supine to semi-supine position and a carrier support adapted to fix the position of the infant carrier while the isolation canopy comprises an overhead capsule type structure having a semiovate (or substantially equivalent) surface extending substantially over and about the infant seat, thereby substantially enclosing the infant seat within an interior space of the isolation device. The environmental monitoring and control system generally includes an audio-visual display system and a media player, a fresh air circulation system and an infant monitoring system.

A video screen, forming part of the audio-visual display system, is mounted to the interior surface of the isolation canopy in its overhead region and, most preferably, takes the shape of the overhead region of the isolation canopy. An audio speaker, also forming part of the audio-visual display system, is disposed within the interior space of the isolation device. The media player, which is adapted to generate a visual display on the video screen and an audio output through the audio speaker, is in a first preferred implementation of the present invention disposed within a portion of a stand provided as a part of the infant stimulation and learning apparatus.

The fresh air circulation system generally comprises an ambient air intake adapted to take in air from without the interior space of the isolation device; an air inlet adapted to deliver air to within the interior space of the isolation device; an airflow outlet adapted to exhaust air from within the interior space of the isolation device to without the interior space of the isolation device; and an air handler, which includes a blower adapted and arranged to convey air from the ambient air intake, through the air inlet to the interior space of the isolation device and out the airflow outlet from the interior space of the isolation device and a filter adapted and arranged to remove particulate matter from air flowing between the ambient air intake and the air inlet. Like the media player, the air handler is in the first preferred implementation of the present invention disposed within a portion of the stand provided as a part of the infant stimulation and learning apparatus.

The infant monitoring system generally includes an imaging device, such as a video camera, disposed within said interior space of the isolation device and adapted and arranged to capture video imagery of an infant supported by the infant seat; a microphone, disposed within said interior space of the isolation device and adapted and arranged to capture sound generated within the interior space of the isolation device; a temperature transducer, disposed within the interior space of the isolation device and adapted and arranged to measure the temperature of the interior space of the isolation device; and a signals transceiver, adapted to transmit signals embodying video imagery captured by the imaging device, sounds captured by the microphone and temperatures measured by the temperature transducer to a location remote from the isolation device.

In an alternatively preferred implementation of the infant stimulation and learning apparatus, the a detachable environmental systems module may be provided to conveniently package and house the media player, the air handler, the signals transceiver or other components of the infant stimulation and learning apparatus not otherwise required to be unitarily disposed with the isolation device.

Additionally, either or both of the foregoing implementations, as well as many others not otherwise described, may be provided with means for securing the infant stimulation and learning apparatus in an automobile seat and/or means for securing the infant stimulation and learning apparatus in an infant stroller. These and other embodiments of the present invention may also include provision as part of the infant carrier of an infant restraint, thereby ensuring the infant's safety during transportation.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Figure 1:
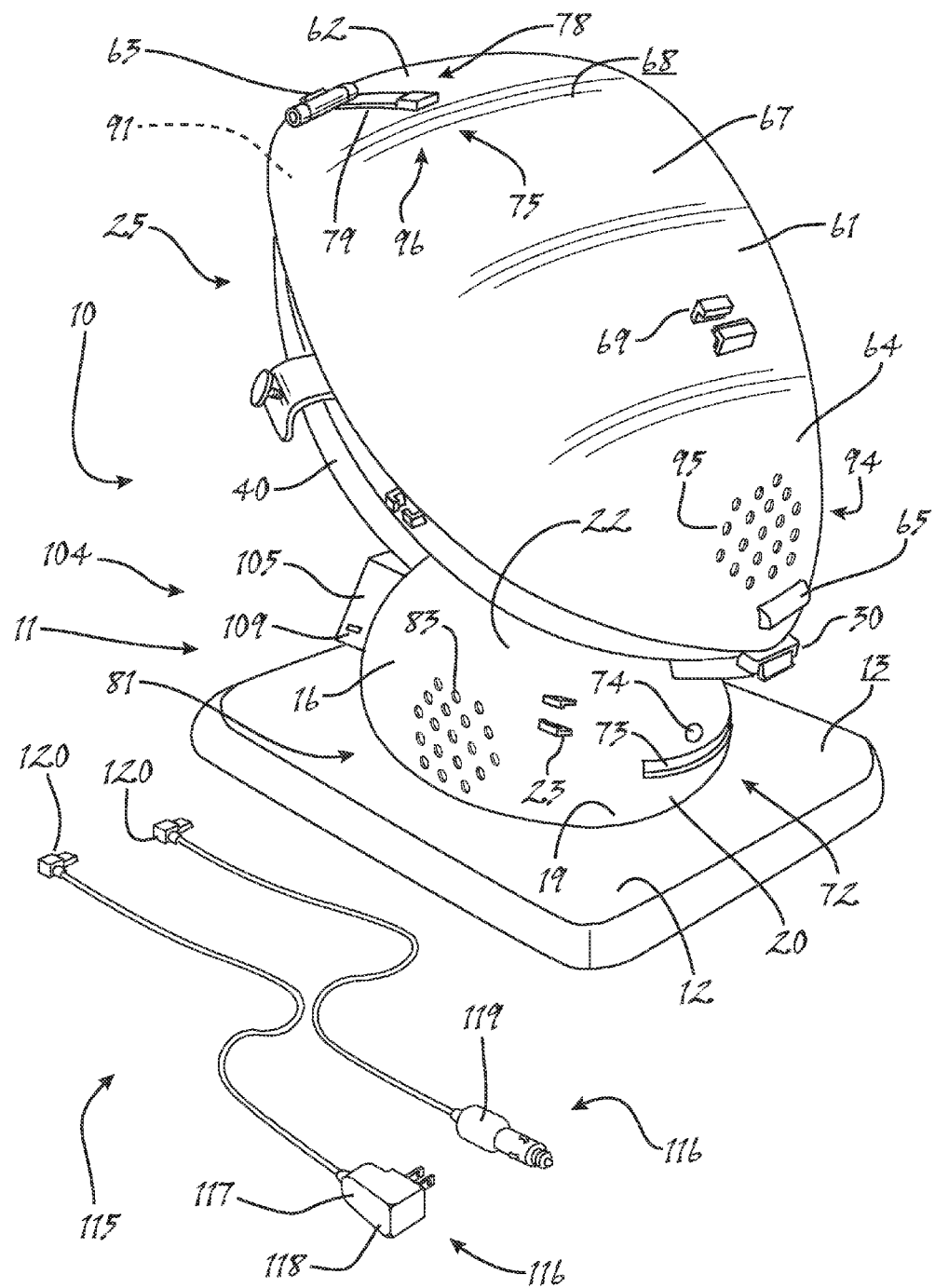
FIG. 1 shows, in a perspective view, a first preferred implementation of the infant stimulation and learning apparatus of the present invention.

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Referring now to the figures, and to FIGS. 1 through 5 in particular, the most preferred implementation of the infant stimulation and learning apparatus 10 of the present invention is shown to generally comprise an isolation device 25 for an infant, which most preferably takes the form of a pod or a capsule having, as shown, a generally ovoid (or substantially equivalent) shape, dependently supported atop a stand 11 and having integrated therewith an audio-visual display system 71, a fresh air circulation system 81 and, in the most preferred implementations, an infant monitoring system 96. A monitoring station for the infant stimulation and learning apparatus 10 includes one or more supervision devices 121 and one or more controllers 122, which may be integral with, corded to or remotely interfaced to the supervision devices 121 and/or the various provisions of the audio-visual display system 71, the fresh air circulation system 81 and/or the infant monitoring system 96 and which, all together, comprise an environmental monitoring and control system for the infant stimulation and learning apparatus 10 of the present invention.

As shown in the figures, the stand 11 preferably comprises a base 12 having a top side 13 and a substantially planar bottom surface 14, which may be provided with a number of conventional foot members 15 to promote stability. In the most preferred implementations of the infant stimulation and learning apparatus 10 of the present invention, the stand 11 also comprises a substantially rigid, i.e. structurally sound, environmental systems housing 16 adapted at its upper portion 17 with a curved passage 18 to dependently support a curvedly shaped tube, bar or like member forming a carrier support 40 for the isolation device 25, as will be better understood further herein. In any case, the lower portion 19 of the provided housing 16, which forms a pedestal upon which the isolation device 25 is mounted, is fixedly attached to the top side 13 of the base 12 of the stand.

The isolation device 25 of the infant stimulation and learning apparatus 10 of the present invention generally comprises an infant carrier 26 having an isolation canopy 61 hingedly or otherwise attached thereto to selectively provide substantial enclosure of the interior space 31 of the infant carrier 26. As shown in the figures, the infant carrier 26 comprises a bottom shell 27, formed of rigid plastic or like material, and also forming an underlying conforming structure for a substantially conventional infant seat 41, which also preferably includes a comfortably padded cushion 42. A carrier support 40, which, as previously mentioned, may comprise a curvedly shaped tube, bar or like member, is attached at one end to the upper, head, end 28 of the bottom shell 27 and at the other end to the lower, foot, end 29 of the bottom shell 27 and is cooperative adapted with the curved passage 18 through the upper portion 17 of the environmental systems housing 16 (or other similar provision of the stand 11) to fix the infant seat 41 in position such that an infant supported therein is supported in a supine to semi-supine body position.

In order to maximize safety of an infant supported in the infant seat 41, especially in implementations (described further herein) comprising means for means for securing the infant stimulation and learning apparatus 10 in an automobile seat (whether directly or through an infant car seat 131) or means for securing the infant stimulation and learning apparatus 10 in an infant stroller 133, the infant carrier 26 is also most preferably provided with an infant restraint 44. As will be appreciated by those of ordinary skill in the art, such an infant restraint 44 may be implemented to include a first strap member 45, a second strap member 49 and, in the most preferred implementations, a shoulder harness 53. As shown in the figures, the first strap member 45 is fixed at its first end 46 to the first side 32 of the bottom shell 27 of the infant carrier 26 and provided at its second, distal end 47 with a fastener 48. Likewise, the second strap member 49 is fixed at its first end 50 to the second side 36 of the bottom shell 27 of the infant carrier 26 and provided at its second, distal end 51 with a complementary fastener 52. The shoulder harness 53 may comprise a first strap member 54 fixed at its upper end 55 to the upper, head end 28 of the bottom shell 27 of the infant carrier 26 and a second strap member 57 fixed at its upper end 58 to the upper, head end 28 of the bottom shell 27 of the infant carrier 26. The distal end of the first strap member 54 and the distal end 59 of the second strap member 57 are each connected to a coupling 60, which is adapted to receive therethrough a portion of the joined first and second strap members 45, 49 as is conventional in other types of infant carriers.

Figure 2:
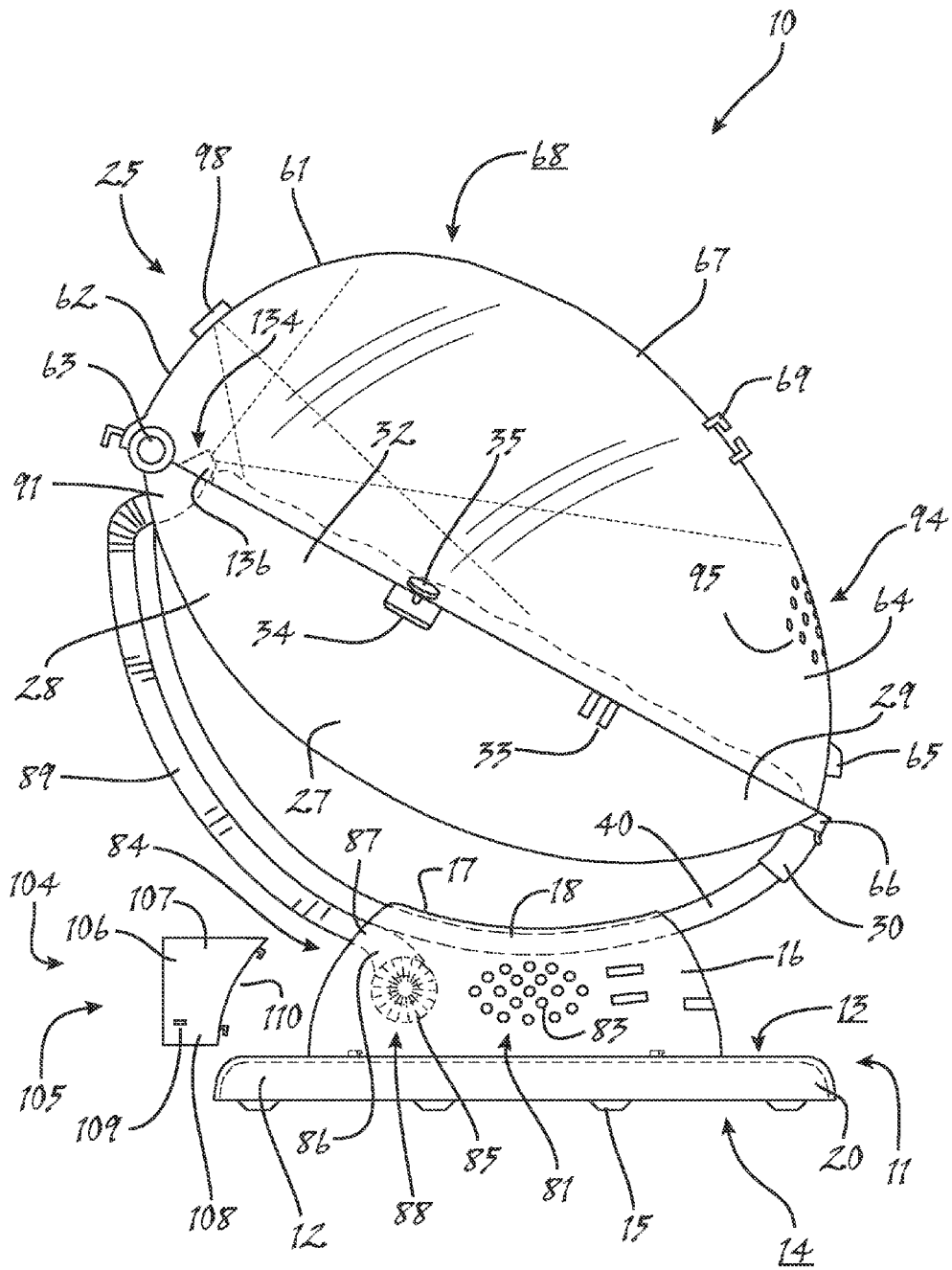
FIG. 2 shows, in a side elevational view, various details of the infant stimulation and learning apparatus of FIG. 1 as depicted with its isolation canopy in its closed position.
Figure 3:
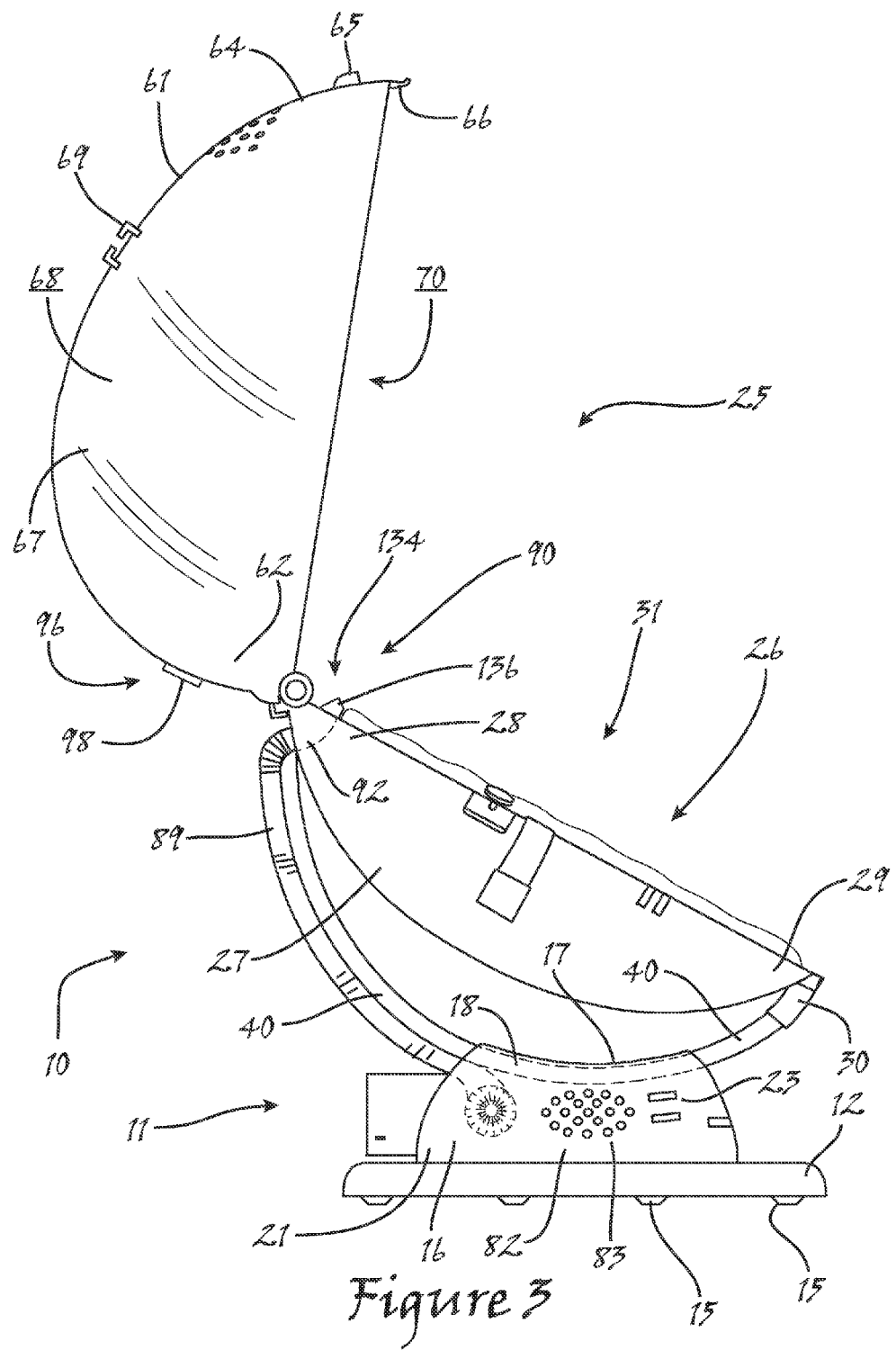
FIG. 3 shows, in a side elevational view generally corresponding to that of FIG. 2, various additional details of the infant stimulation and learning apparatus of FIG. 1 as depicted with its isolation canopy in its open position.
Figure 4:
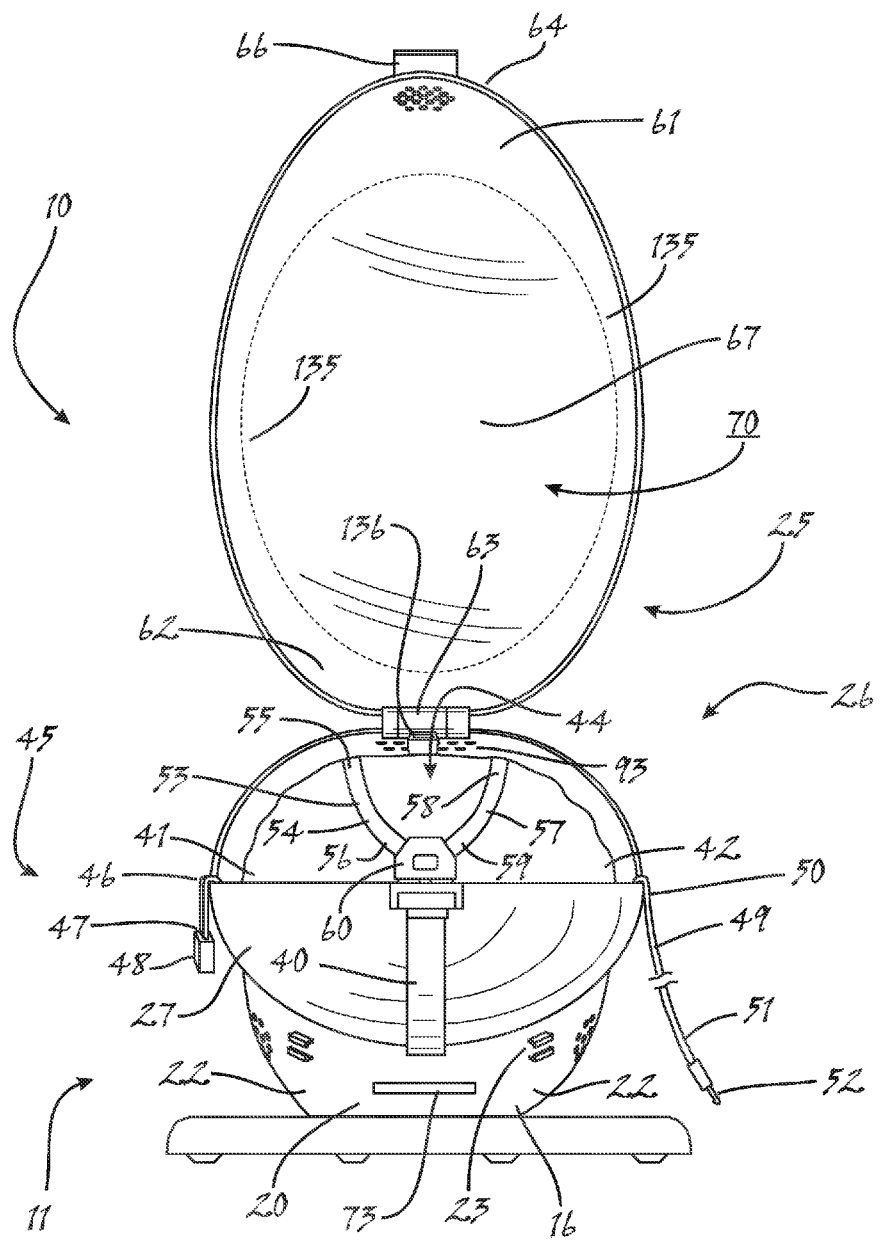
FIG. 4 shows, in a front elevational view, the infant stimulation and learning apparatus of FIG. 1 as depicted with its isolation canopy in the open position as generally depicted in FIG. 3.
Figure 5:
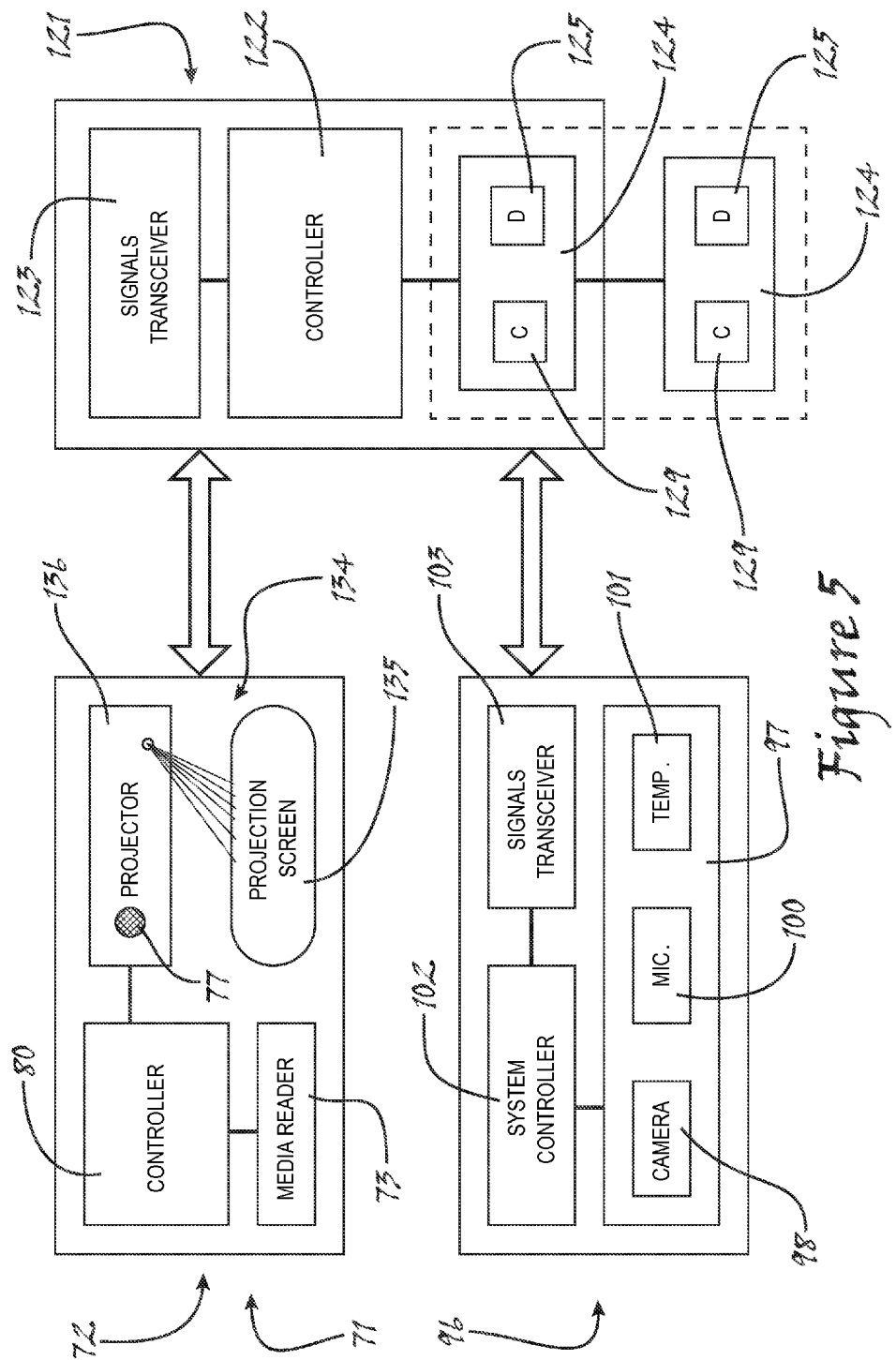
FIG. 5 shows, in a functional block diagram, the interrelationship of various components of the various possible implementations of the infant stimulation and learning apparatus of the present invention.

The isolation canopy 61, which in this most preferred implementation of the present invention is of an opaque plastics type material, is sized and shaped as generally depicted in the figures to give the isolation device 25 the overall character of a pod or capsule having a semiovate (or substantially equivalent) interior surface 70. As shown in the figures, the isolation canopy 61, which comprises a lofted overhead (as viewed with the isolation canopy 61 in its closed position) region 67, is preferably attached at its upper, head, end 62 to the upper, head, end 28 of the bottom shell 27 of the infant carrier 26 through a preferably spring-load hinge 63, which is biased to hold the isolation canopy 61 in its open position as generally depicted in FIG. 3. The isolation canopy 61 is also provided with a latch hook 66, which may include a unitary operating handle, at its lower, foot, end 64 for engaging a latch catch 30 provided at the lower, foot, end 29 of the bottom shell 27 of the infant carrier to secure the isolation canopy in its closed position as generally depicted in FIG. 2. Additionally, an isolation canopy handle 65 may be provided on the exterior surface 68 of the isolation canopy 61 to aid in opening and closing of the isolation canopy 61. In any case, it is noted that while the depicted implementation of the isolation canopy 61 shows the isolation canopy 61 to completely cover the infant carrier 26, the present invention contemplates that the isolation canopy 61 need only substantially enclose the infant seat 41 within the interior space 31 of the isolation device 25, to with the isolation canopy 61 may leave uncovered some or all of a supported infant's feet and lower legs.

As shown in the figures, the audio-visual display system 71 of the infant stimulation and learning apparatus 10 of the present invention comprises at least one media player 72 connected through an electrical interface to a video projection system 134 and a controller 80 for conventionally controlling operation of the media player 72 and video projection system 134. The media player 72, which may generally comprise an otherwise conventional hardware and/or software implementation and, along with the controller 80, is most preferably contained within the environmental systems housing 16 of the stand 11, preferably comprises a media reader 73, such as for example a DVD or like player. To this end, of course, additional components such as, for example, an ejection button 74 as depicted at the front end portion 20 of the environmental systems housing 16 may be provided. Additionally, the controller 80 for the audio-visual display system 71 may, at least in this implementation, comprise a hardware and/or software solution for conforming any projected video to the interior shape of the interior surface 70 of the isolation canopy, upon which (as will be better understood further herein) a video projection screen 135 is formed or otherwise provided. To this end, the full disclosure of U.S. Pat. No. 8,358,317 B2 issued Jan. 22, 2013 to Carlson is incorporated herein as though now set forth in its entirety.

In critical aspects of this most preferred implementation of the present invention, the video projection system 134 comprises a video projection screen 135 (utilized in connection with a video projector 136), which is formed unitary with, or mounted in, the overhead region 67 of the isolation canopy 61, to the interior surface 70 of the isolation canopy 61 (to give the video projection screen 135 the shape of the overhead region 67 of the isolation canopy 61) and an audio speaker 77 disposed within the interior space 31 of the isolation device 25. In this manner, an infant supported in the infant seat 41 of the infant carrier 26 may be fully exposed to media played through the media reader 73 while isolated from external distractions.

To ensure that an infant supported in the infant seat 41 of the infant carrier 26 is maximally comfortable, thereby preventing distraction, and to promote the general health of an infant utilizing the infant stimulation and learning apparatus 10 of the present invention, a fresh air circulation system 81 is also provided as a critical aspect of the present invention. As shown in the figures, the fresh air circulation system 81 generally comprises an ambient air intake 82 adapted to take in air from without the interior space 31 of the isolation device 25; a filtered air inlet 90 adapted to deliver air to within the interior space 31 of the isolation device 25; an airflow outlet 94 adapted to exhaust air from within the interior space 31 of the isolation device 25 to without the interior space 31 of the isolation device 25; and an air handler 84, which includes a blower 85 adapted and arranged to convey air from the ambient air intake 83 (which may comprise one or more ports 83 provided through the environmental systems housing 16), through the air inlet 90 to the interior space 31 of the isolation device 25 and out the airflow outlet 94 (which most preferably comprises one or more ports 95 provided through the lower, foot, end 64 or the isolation canopy 61) from the interior space 31 of the isolation device 25. Additionally, it is noted that the ports 95 through the lower, foot, end 64 or the isolation canopy 61 double as a safety device in event of failure of the fresh air circulation system 81.

A preferably HEPA or other high quality filter 88 adapted and arranged to remove particulate matter from air flowing between the ambient air intake 82 and the air inlet 90. In the most preferred implementation of the present invention, the filer 88 is integrally provided with the blower 85. Like the media player, the air handler 84 is in the first preferred implementation of the present invention disposed within a portion of the stand 11 provided as a part of the infant stimulation and learning apparatus 10. In the alternative, however, a detachable environmental systems module 24 (as particularly shown in FIG. 7) may be provided to conveniently package and house the media player 72, the air handler 84 and other components of the infant stimulation and learning apparatus 10 not otherwise required to be unitarily disposed with the isolation device 25, which may be particularly advantageous in implementations also provided with means for securing the infant stimulation and learning apparatus 10 in an automobile seat and/or means for securing the infant stimulation and learning apparatus 10 in an infant stroller 133.

In any case, the blower 85 also comprises an exhaust port 86 to a hose connected 87 adapted to connect a preferably detachable air hose 89. The air hose 89 is adapted to connect to an air source hose connector 92 leading to a simple manifold 91 implementing the most preferred embodiment of the filtered air inlet 90 to the interior space 31 of the isolation device 25. As will, with the benefit of this exemplary description, be appreciated by those of ordinary skill in the art, the manifold 91 implemented as generally depicted in FIGS. 1 and 2 to comprise a plurality of directional ports 93, serves to ensure (1) that the filtered air inlet 90 to the interior space 31 of the isolation device 25 is not inadvertently block by a blanket or pillow or the like and (2) that airflow into the interior space 31 of the isolation device 25 is generally directed toward the interior surface 70 of the overhead region 67 of the isolation canopy 61, thereby not blowing directly on an infant supported in the infant seat 41 of the infant carrier 26.

In the most preferred implementations of the infant stimulation and learning apparatus 10 of the present invention, an infant monitoring system 96 is provided integral with the audio-visual display system 71. As shown in the figures, and particularly in FIGS. 1 through 6, the infant monitoring system 96 as implemented in the present invention generally comprises one or more monitoring devices 97 and a systems controller 102, which will typically also comprise a signals transceiver 103, provided within or in close proximity to the isolation device 25 and one or more supervision devices 124, including a controller 122 and signals transceiver 123 (adapted for receiving audio, video and temperature signals and transmitting control inputs), provided at a monitoring station which may be remote from the isolation device 25.

As shown in the figures, the monitoring devices 97 preferably comprise a video camera 98 (or substantially equivalent imaging device), a microphone 100 and a temperature transducer 101. Because the monitoring devices should be provided within the interior space 31 of the isolation device 25, those of ordinary skill in the art will recognized that care should be taken to ensure that the video camera 98 is placed such that its field of view is outside of the field of projection of the video projector 136, as most clearly depicted in FIG. 2. In any case, however, the system controller 102 and signals transceiver 103 (adapted for transmitting audio, video and temperature signals and receiving control inputs) are preferably provided integral with the media player 72 and controller 80 for the audio-visual display system 71 and contained therewith in the environmental systems housing 16 or, in the alternative, the environmental systems module 24.

The supervision devices 121 may comprise a separate, otherwise conventional baby monitor, in which case an appropriate interface device should be implemented (as is within the ordinary skill in the art) or an adapted or otherwise repurposed conventional device such as, for example, a television set, computer system, smart phone or the like. The controller 122 may be integral with or in corded connection to any of the foregoing supervision devices 121 or the like or may be implemented as a remote control, as particularly depicted in FIG. 6. In the latter case, especially, it is noted that such the signals transceiver 123 implemented in connection with the monitoring station may be adapted to communicate directly with the signals transceiver 103 implemented in connection with the monitoring devices 97. In any case, the controller 122 includes a user interface, which preferably comprises display devices 125 such as, for example, a video screen and/or a liquid crystal display (LCD) or like display 126; a microphone 127; and audio speaker 128; and a plurality of user control interfaces 129 such as, for example, conventional pushbutton or like switches 130.

Referring now FIGS. 6 through 10, in particular, an alternatively preferred implementation of the infant stimulation and learning apparatus 10 of the present invention is shown to generally comprise an isolation device 25 for an infant, which most preferably takes the form of a pod or a capsule having, as shown, a generally ovoid (or substantially equivalent) shape, dependently supported atop a stand 11 and having integrated therewith an audio-visual display system 71, a fresh air circulation system 81 and, in the most preferred implementations, an infant monitoring system 96. A monitoring station for the infant stimulation and learning apparatus 10 includes one or more supervision devices 121 and one or more controllers 122, which may be integral with, corded to or remotely interfaced to the supervision devices 121 and/or the various provisions of the audio-visual display system 71, the fresh air circulation system 81 and/or the infant monitoring system 96 and which, all together, comprise an environmental monitoring and control system for the infant stimulation and learning apparatus 10 of the present invention.

As shown in the figures, the stand 11 preferably comprises a base 12 having a top side 13 and a substantially planar bottom surface 14, which may be provided with a number of conventional foot members 15 to promote stability. In the most preferred implementations of the infant stimulation and learning apparatus 10 of the present invention, the stand 11 also comprises a substantially rigid, i.e. structurally sound, environmental systems housing 16 adapted at its upper portion 17 with a curved passage 18 to dependently support a curvedly shaped tube, bar or like member forming a carrier support 40 for the isolation device 25, as will be better understood further herein. In any case, the lower portion 19 of the provided housing 16, which forms a pedestal upon which the isolation device 25 is mounted, is fixedly attached to the top side 13 of the base 12 of the stand.

The isolation device 25 of the infant stimulation and learning apparatus 10 of the present invention generally comprises an infant carrier 26 having an isolation canopy 61 hingedly or otherwise attached thereto to selectively provide substantial enclosure of the interior space 31 of the infant carrier 26. As shown in the figures, the infant carrier 26 comprises a bottom shell 27, formed of rigid plastic or like material, and also forming an underlying conforming structure for a substantially conventional infant seat 41, which also preferably includes a comfortably padded cushion 42. A carrier support 40, which, as previously mentioned, may comprise a curvedly shaped tube, bar or like member, is attached at one end to the upper, head, end 28 of the bottom shell 27 and at the other end to the lower, foot, end 29 of the bottom shell 27 and is cooperative adapted with the curved passage 18 through the upper portion 17 of the environmental systems housing 16 (or other similar provision of the stand 11) to fix the infant seat 41 in position such that an infant supported therein is supported in a supine to semi-supine body position.

In order to maximize safety of an infant supported in the infant seat 41, especially in implementations (described further herein) comprising means for means for securing the infant stimulation and learning apparatus 10 in an automobile seat (whether directly or through an infant car seat 131) or means for securing the infant stimulation and learning apparatus 10 in an infant stroller 133, the infant carrier 26 is also most preferably provided with an infant restraint 44. As will be appreciated by those of ordinary skill in the art, such an infant restraint 44 may be implemented to include a first strap member 45, a second strap member 49 and, in the most preferred implementations, a shoulder harness 53. As shown in the figures, the first strap member 45 is fixed at its first end 46 to the first side 32 of the bottom shell 27 of the infant carrier 26 and provided at its second, distal end 47 with a fastener 48. Likewise, the second strap member 49 is fixed at its first end 50 to the second side 36 of the bottom shell 27 of the infant carrier 26 and provided at its second, distal end 51 with a complementary fastener 52. The shoulder harness 53 may comprise a first strap member 54 fixed at its upper end 55 to the upper, head end 28 of the bottom shell 27 of the infant carrier 26 and a second strap member 57 fixed at its upper end 58 to the upper, head end 28 of the bottom shell 27 of the infant carrier 26. The distal end of the first strap member 54 and the distal end 59 of the second strap member 57 are each connected to a coupling 60, which is adapted to receive therethrough a portion of the joined first and second strap members 45, 49 as is conventional in other types of infant carriers.

Figure 7:
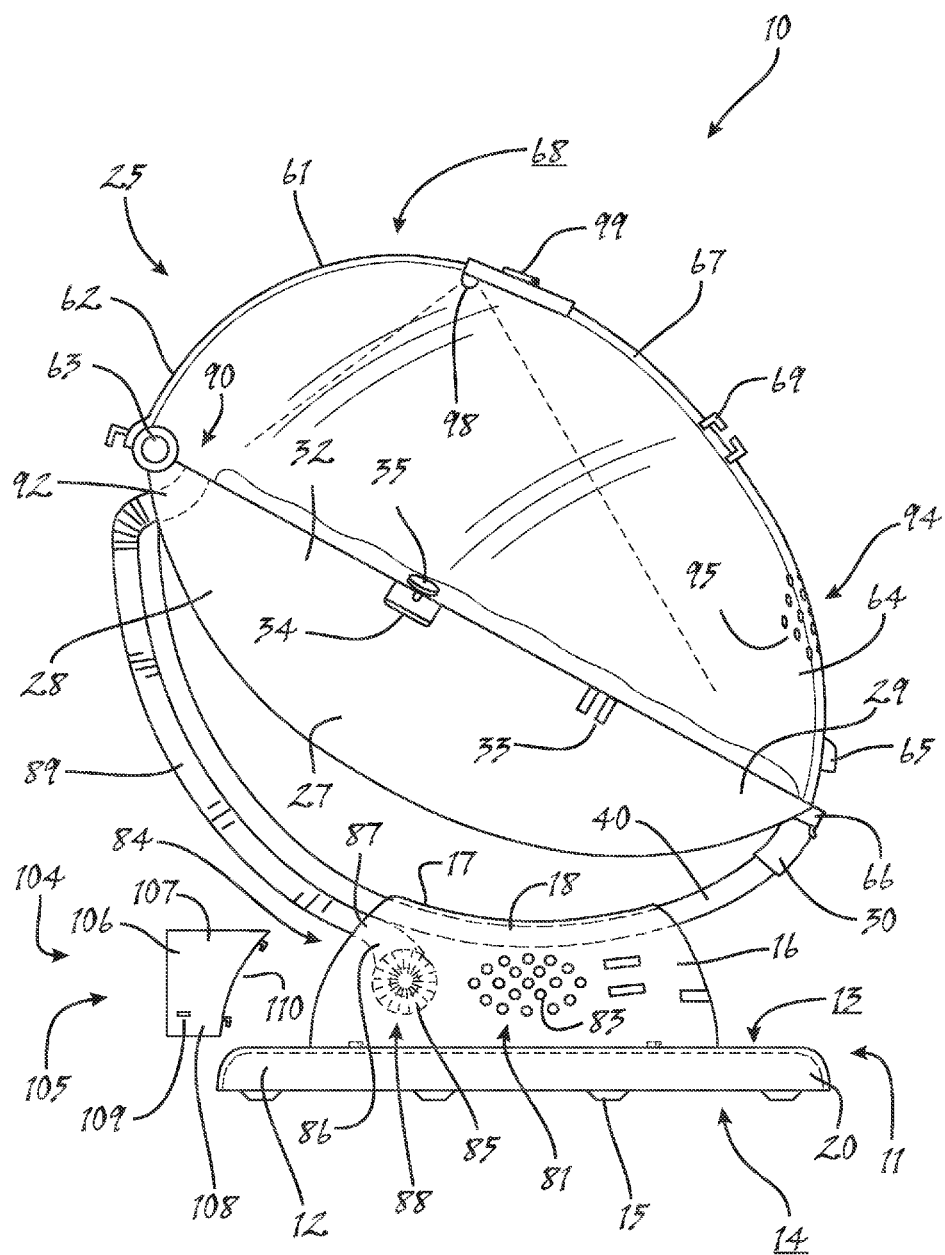
FIG. 7 shows, in a side elevational view, various details of the infant stimulation and learning apparatus of FIG. 6 as depicted with its isolation canopy in its closed position.
Figure 8:
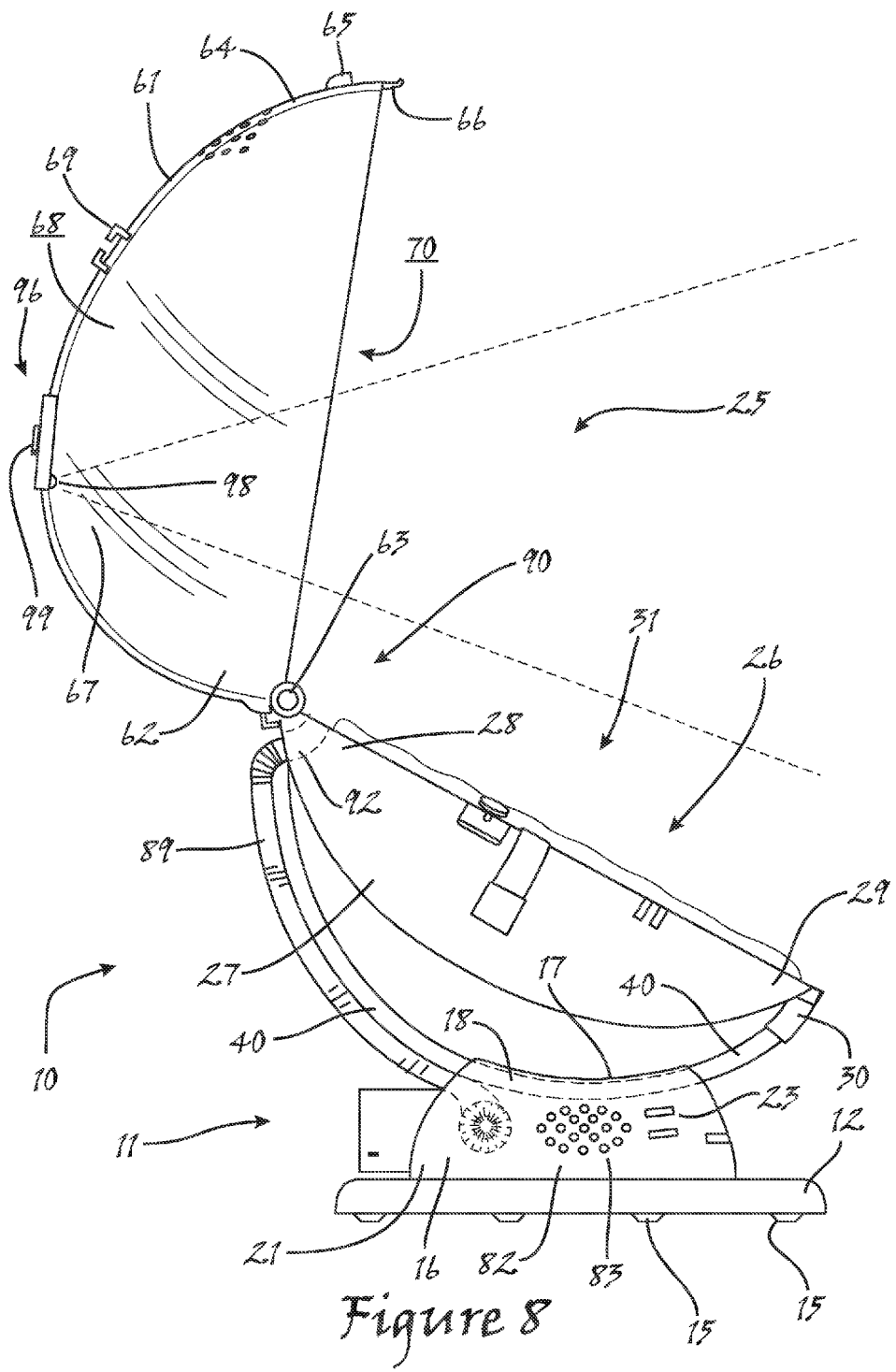
FIG. 8 shows, in a side elevational view generally corresponding to that of FIG. 7, various additional details of the infant stimulation and learning apparatus of FIG. 6 as depicted with its isolation canopy in its open position.
Figure 9:
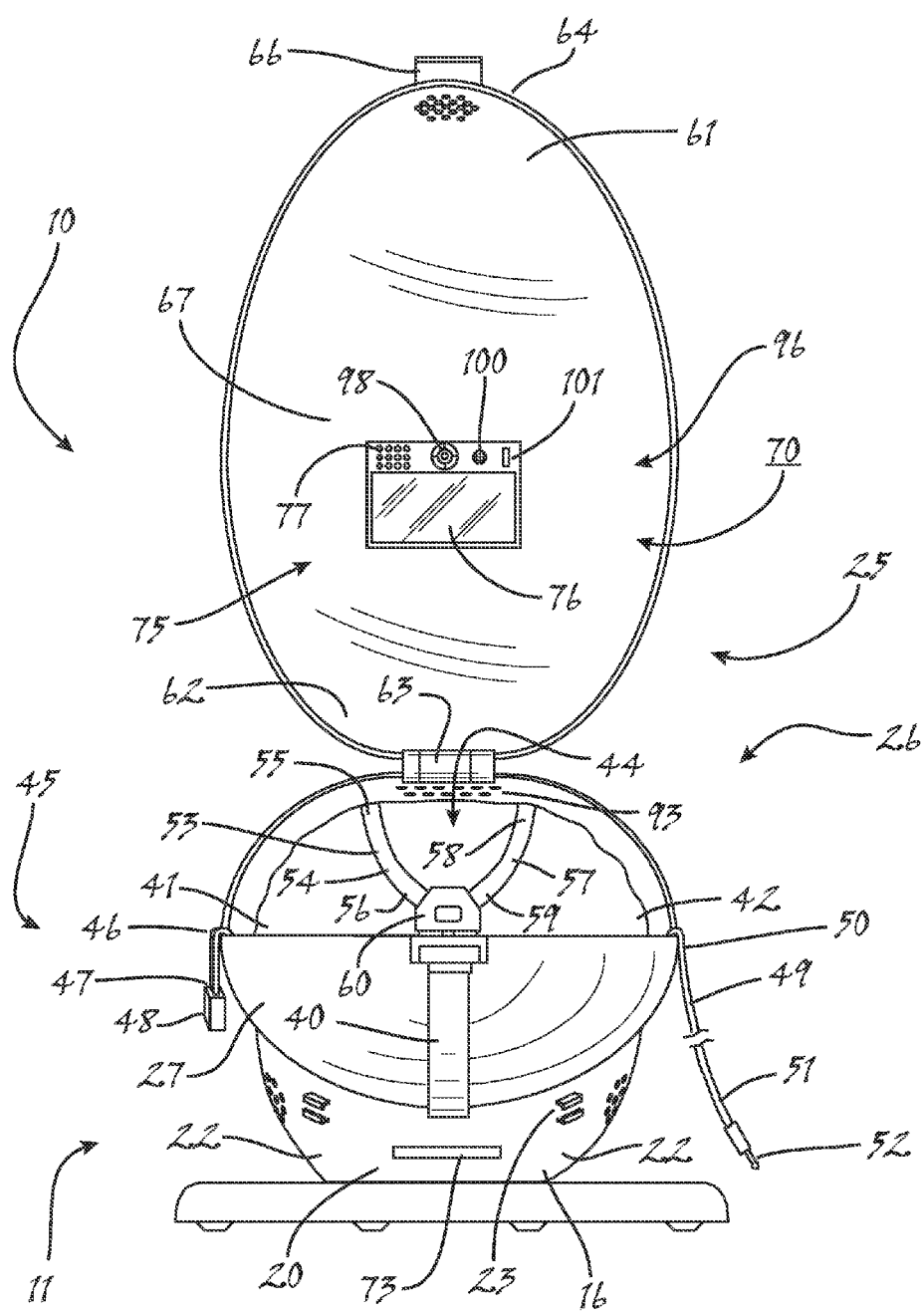
FIG. 9 shows, in a front elevational view, the infant stimulation and learning apparatus of FIG. 6 as depicted with its isolation canopy in the open position as generally depicted in FIG. 8.
Figure 10:
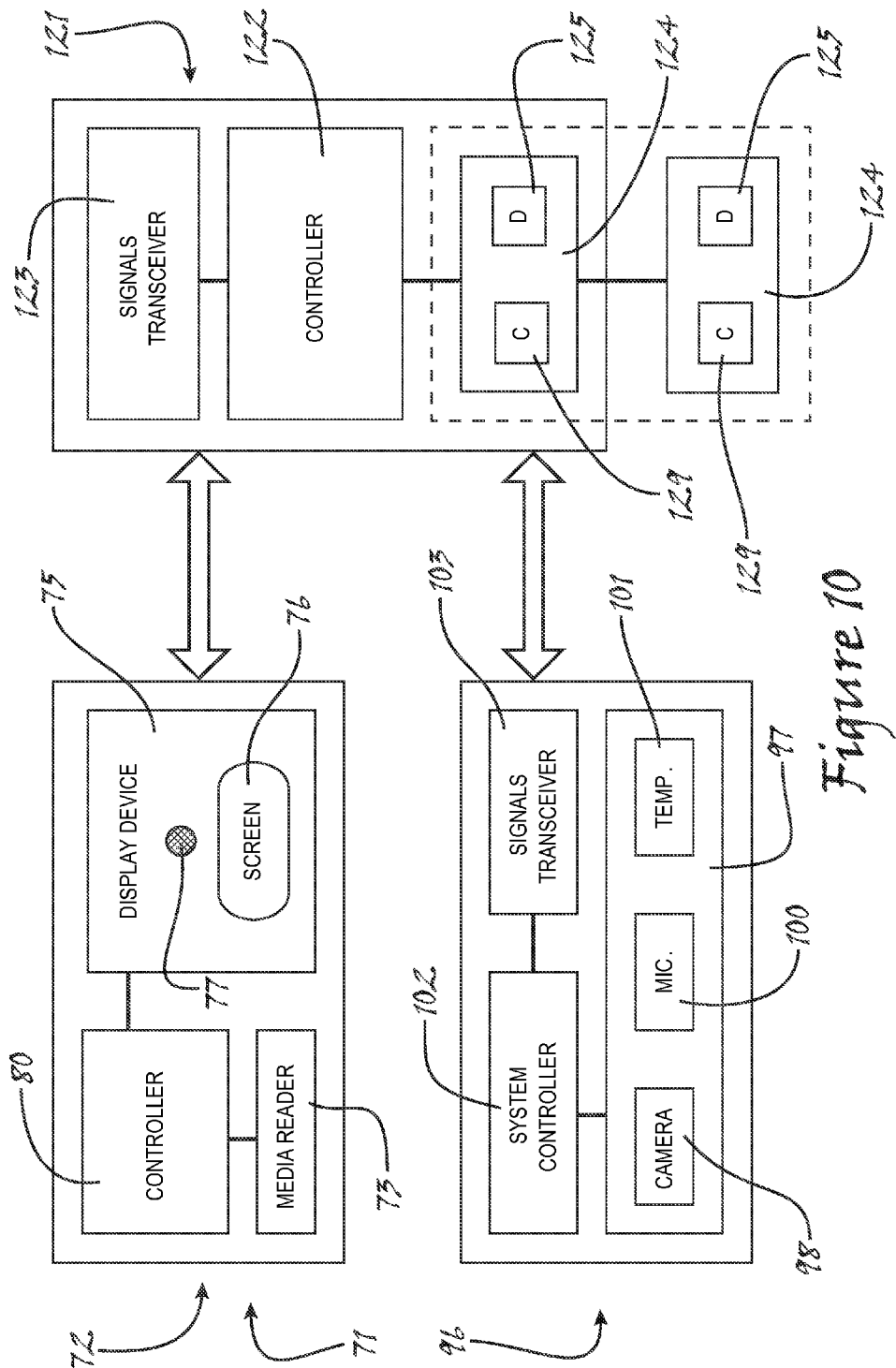
FIG. 10 shows, in a functional block diagram, an alternative interrelationship of various components of the various implementations of the infant stimulation and learning apparatus of the present invention.
Figure 11:
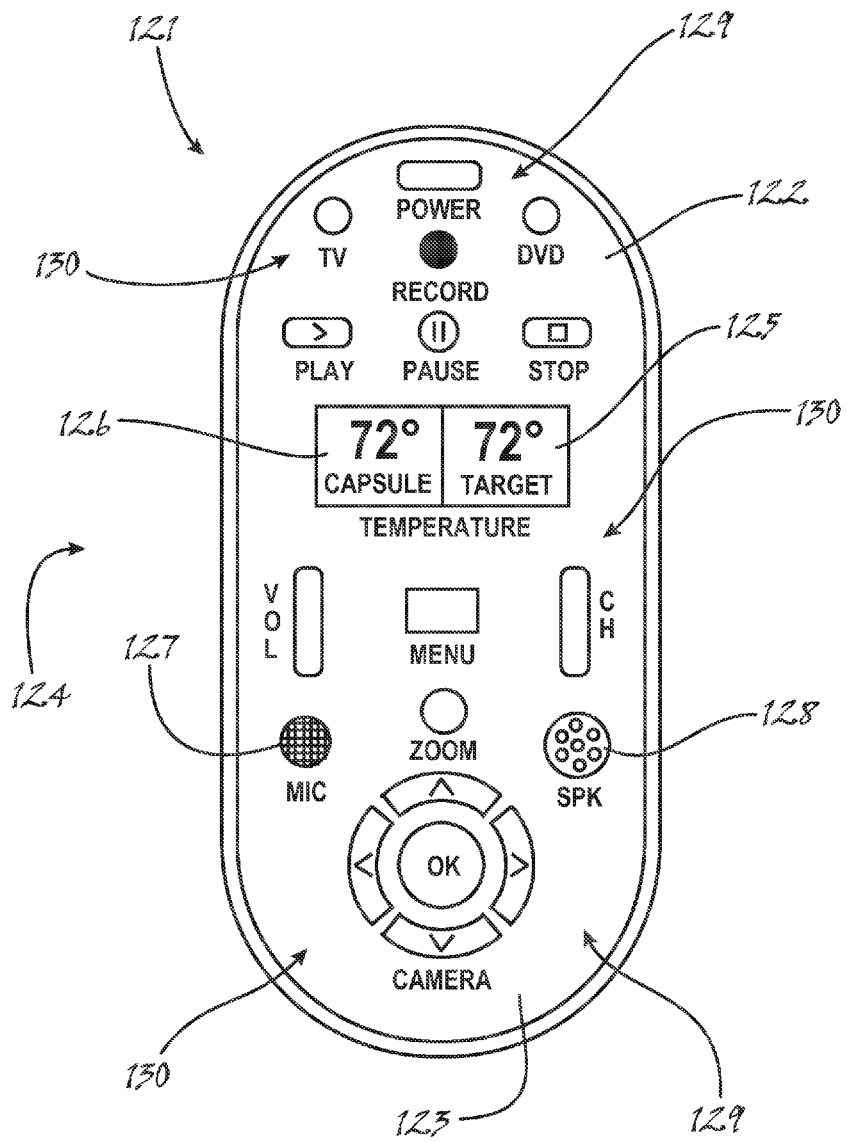
FIG. 11 shows, in a top plan view, an exemplary remote control device as may form at least some implementations of the infant stimulation and learning apparatus of the present invention.

The isolation canopy 61, which is preferably formed of a clear plastics type material, is sized and shaped as generally depicted in the figures to give the isolation device 25 the overall character of a pod or capsule having a semiovate (or substantially equivalent) interior surface 70. As shown in the figures, the isolation canopy 61, which comprises a lofted overhead (as viewed with the isolation canopy 61 in its closed position) region 67, is preferably attached at its upper, head, end 62 to the upper, head, end 28 of the bottom shell 27 of the infant carrier 26 through a preferably spring-load hinge 63, which is biased to hold the isolation canopy 61 in its open position as generally depicted in FIG. 8. The isolation canopy 61 is also provided with a latch hook 66, which may include a unitary operating handle, at its lower, foot, end 64 for engaging a latch catch 30 provided at the lower, foot, end 29 of the bottom shell 27 of the infant carrier to secure the isolation canopy in its closed position as generally depicted in FIG. 7. Additionally, an isolation canopy handle 65 may be provided on the exterior surface 68 of the isolation canopy 61 to aid in opening and closing of the isolation canopy 61. In any case, it is noted that while the depicted implementation of the isolation canopy 61 shows the isolation canopy 61 to completely cover the infant carrier 26, the present invention contemplates that the isolation canopy 61 need only substantially enclose the infant seat 41 within the interior space 31 of the isolation device 25, to with the isolation canopy 61 may leave uncovered some or all of a supported infant's feet and lower legs.

As shown in the figures, the audio-visual display system 71 of the infant stimulation and learning apparatus 10 of the present invention comprises at least one media player 72 connected through an electrical interface 78 (e.g., a ribbon cable 79) to an audio-visual display device 75 and a controller 80 for conventionally controlling operation of the media player 72 and audio-visual display device 75. The media player 72, which may generally comprise an otherwise conventional hardware and/or software implementation and, along with the controller 80, is most preferably contained within the environmental systems housing 16 of the stand 11, preferably comprises a media reader 73, such as for example a DVD or like player. To this end, of course, additional components such as, for example, an ejection button 74 as depicted at the front end portion 20 of the environmental systems housing 16 may be provided.

In critical aspects of the present invention, the audio-visual display device 75 comprises a video screen 76 or the substantial equivalent thereof (e.g., a video projection screen utilized in connection with a video projection system also comprising a video projector) that is mounted, in the overhead region 67 of the isolation canopy 61, to the interior surface 70 of the isolation canopy and an audio speaker 77 disposed within the interior space 31 of the isolation device 25. In this manner, an infant supported in the infant seat 41 of the infant carrier 26 may be fully exposed to media played through the media reader 73 while isolated from external distractions.

To ensure that an infant supported in the infant seat 41 of the infant carrier 26 is maximally comfortable, thereby preventing distraction, and to promote the general health of an infant utilizing the infant stimulation and learning apparatus 10 of the present invention, a fresh air circulation system 81 is also provided as a critical aspect of the present invention. As shown in the figures, the fresh air circulation system 81 generally comprises an ambient air intake 82 adapted to take in air from without the interior space 31 of the isolation device 25; a filtered air inlet 90 adapted to deliver air to within the interior space 31 of the isolation device 25; an airflow outlet 94 adapted to exhaust air from within the interior space 31 of the isolation device 25 to without the interior space 31 of the isolation device 25; and an air handler 84, which includes a blower 85 adapted and arranged to convey air from the ambient air intake 83 (which may comprise one or more ports 83 provided through the environmental systems housing 16), through the air inlet 90 to the interior space 31 of the isolation device 25 and out the airflow outlet 94 (which most preferably comprises one or more ports 95 provided through the lower, foot, end 64 or the isolation canopy 61) from the interior space 31 of the isolation device 25. Additionally, it is noted that the ports 95 through the lower, foot, end 64 or the isolation canopy 61 double as a safety device in event of failure of the fresh air circulation system 81.

Figure 12:
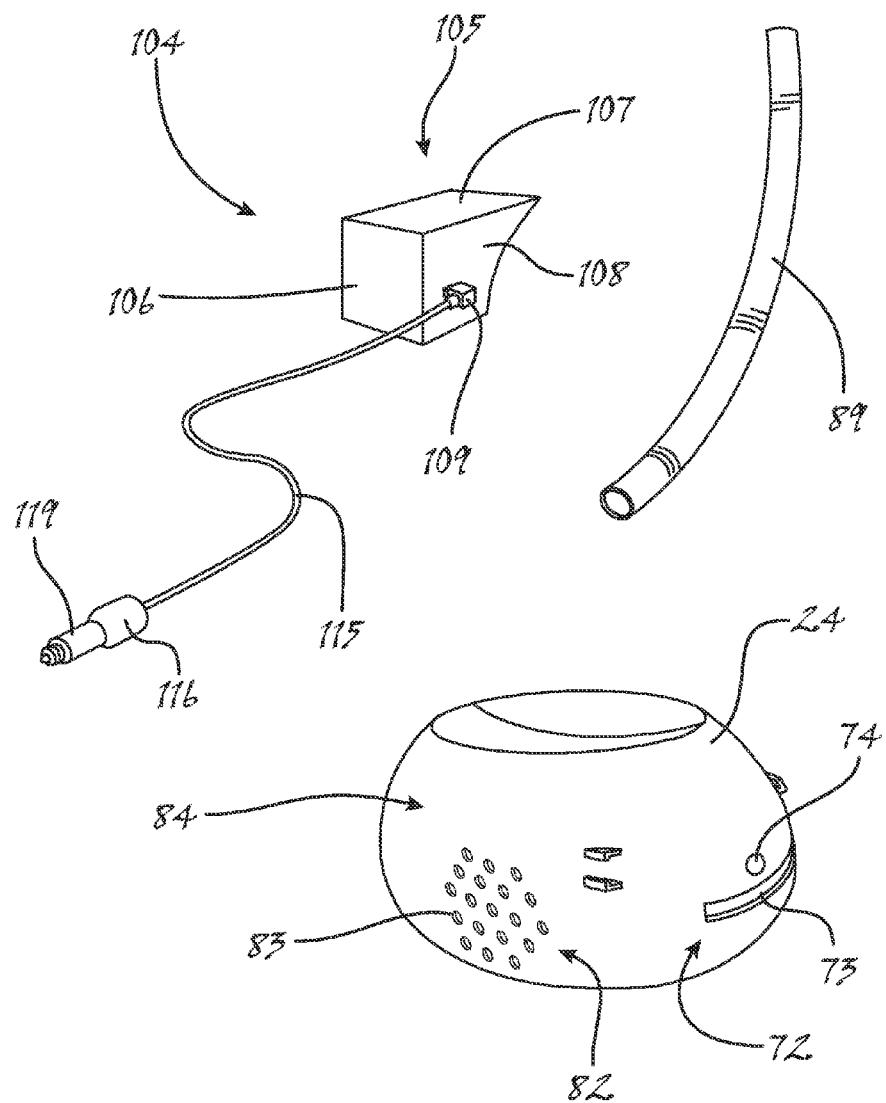
FIG. 12 shows, in a perspective view, various components of a third preferred implementation of the infant stimulation and learning apparatus of the present invention.

A preferably HEPA or other high quality filter 88 adapted and arranged to remove particulate matter from air flowing between the ambient air intake 82 and the air inlet 90. In the most preferred implementation of the present invention, the filer 88 is integrally provided with the blower 85. Like the media player, the air handler 84 is in the first preferred implementation of the present invention disposed within a portion of the stand 11 provided as a part of the infant stimulation and learning apparatus 10. In the alternative, however, a detachable environmental systems module 24 (as particularly shown in FIG. 12) may be provided to conveniently package and house the media player 72, the air handler 84 and other components of the infant stimulation and learning apparatus 10 not otherwise required to be unitarily disposed with the isolation device 25, which may be particularly advantageous in implementations also provided with means for securing the infant stimulation and learning apparatus 10 in an automobile seat and/or means for securing the infant stimulation and learning apparatus 10 in an infant stroller 133.

Figure 6:
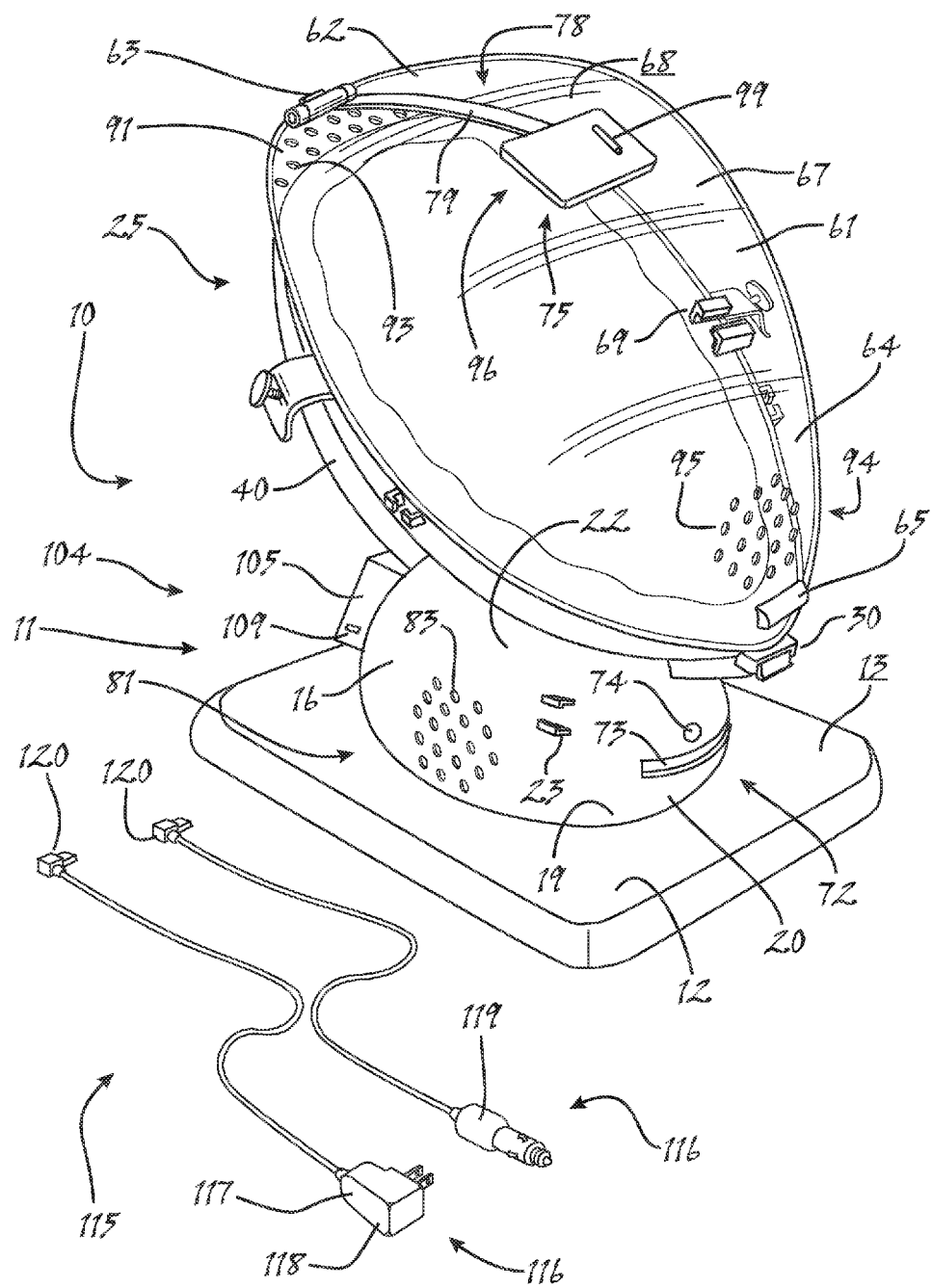
FIG. 6 shows, in a perspective view, a alternatively preferred implementation of the infant stimulation and learning apparatus of the present invention.

In any case, the blower 85 also comprises an exhaust port 86 to a hose connected 87 adapted to connect a preferably detachable air hose 89. The air hose 89 is adapted to connect to an air source hose connector 92 leading to a simple manifold 91 implementing the most preferred embodiment of the filtered air inlet 90 to the interior space 31 of the isolation device 25. As will, with the benefit of this exemplary description, be appreciated by those of ordinary skill in the art, the manifold 91 implemented as generally depicted in FIGS. 6 and 7 to comprise a plurality of directional ports 93, serves to ensure (1) that the filtered air inlet 90 to the interior space 31 of the isolation device 25 is not inadvertently block by a blanket or pillow or the like and (2) that airflow into the interior space 31 of the isolation device 25 is generally directed toward the interior surface 70 of the overhead region 67 of the isolation canopy 61, thereby not blowing directly on an infant supported in the infant seat 41 of the infant carrier 26.

In the most preferred implementations of the infant stimulation and learning apparatus 10 of the present invention, an infant monitoring system 96 is provided integral with the audio-visual display system 71. As shown in the figures, and particularly in FIGS. 6 through 11, the infant monitoring system 96 as implemented in the present invention generally comprises one or more monitoring devices 97 and a systems controller 102, which will typically also comprise a signals transceiver 103, provided within or in close proximity to the isolation device 25 and one or more supervision devices 124, including a controller 122 and signals transceiver 123 (adapted for receiving audio, video and temperature signals and transmitting control inputs), provided at a monitoring station which may be remote from the isolation device 25.

As shown in the figures, the monitoring devices 97 preferably comprise a video camera 98 (or substantially equivalent imaging device), a microphone 100 and a temperature transducer 101. Because the monitoring devices should be provided within the interior space 31 of the isolation device 25, the video camera 98, microphone 100 and temperature transducer 101 are preferably provided integral with the audio-visual display device 75 as most clearly depicted in FIG. 9. Similarly, the system controller 102 and signals transceiver 103 (adapted for transmitting audio, video and temperature signals and receiving control inputs) are preferably provided integral with the media player 72 and controller 80 for the audio-visual display system 71 and contained therewith in the environmental systems housing 16 or, in the alternative, the environmental systems module 24.

The supervision devices 121 may comprise a separate, otherwise conventional baby monitor, in which case an appropriate interface device should be implemented (as is within the ordinary skill in the art), or may comprise an adapted or otherwise repurposed conventional device such as, for example, a television set, computer system, smart phone or the like. The controller 122 may be integral with or in corded connection to any of the foregoing supervision devices 121 or the like or may be implemented as a remote control, as particularly depicted in FIG. 11. In the latter case, especially, it is noted that the signals transceiver 123 implemented in connection with the monitoring station may be adapted to communicate directly with the signals transceiver 103 implemented in connection with the monitoring devices 97. In any case, each implemented controller 122 includes a user interface 124, which preferably comprises display devices 125 such as, for example, a video screen and/or a liquid crystal display (LCD) or like display 126; a microphone 127; an audio speaker 128; and a plurality of user control interfaces 129 such as, for example, conventional pushbutton or like switches 130.

Figure 13:
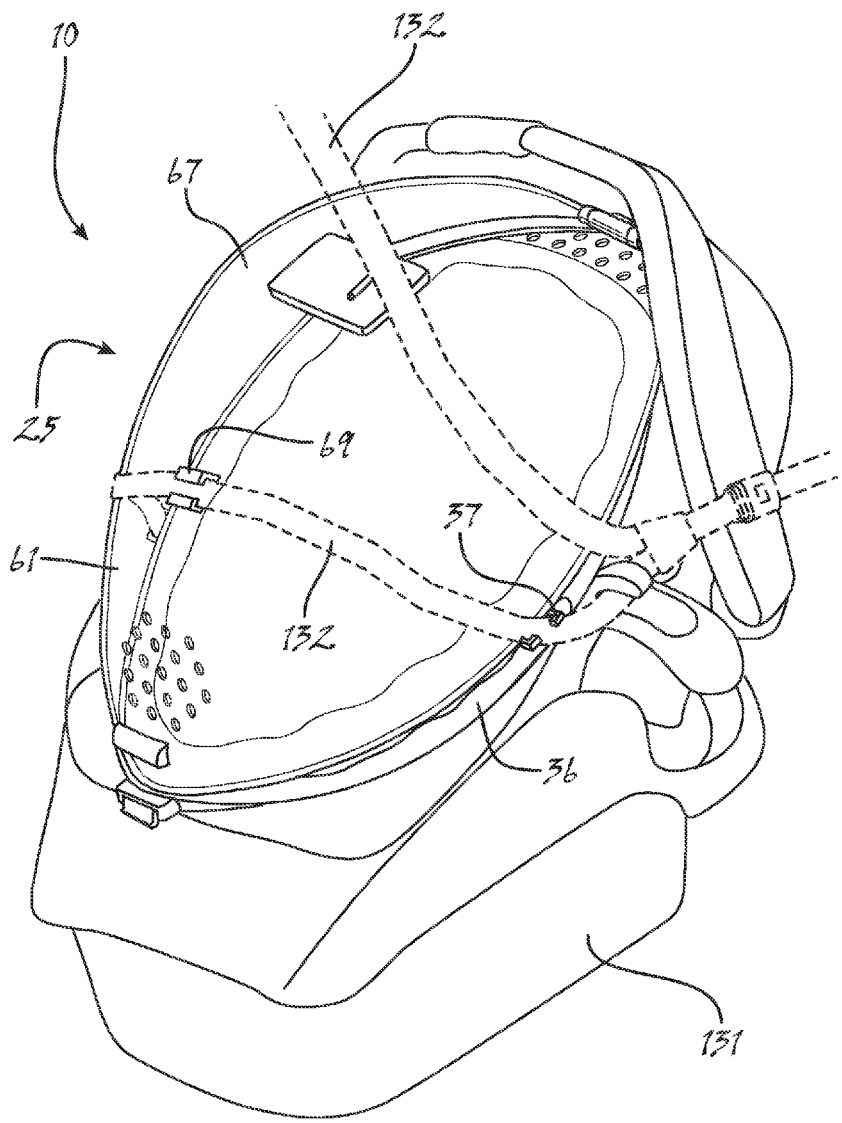
FIG. 13 shows, in a perspective view, various details of a means for securing an implementation of the infant stimulation and learning apparatus of the present invention in an automobile car seat.

As previously mentioned the infant stimulation and learning apparatus 10 of the present invention may be provided with means for securing the infant stimulation and learning apparatus 10 in an automobile seat and/or means for securing the infant stimulation and learning apparatus 10 in an infant stroller 133. As particularly shown in FIG. 13, with reference also to the other figures, a means for securing the infant stimulation and learning apparatus 10 in an automobile seat may comprise the provision of seatbelt brackets 23 on the side surfaces 22 of the environmental systems housing 16 as well as a seatbelt bracket 33 on the first side 32 of the bottom shell 27 of the infant carrier, a seatbelt bracket 37 on the second side 36 of the bottom shell 27 of the infant carrier and a seatbelt bracket 69 on the exterior surface 68 of the isolation canopy 61. As particularly shown in FIG. 13, such brackets may then be used to securely maintain the position, about the infant stimulation and learning apparatus 10, of an automobile seatbelt 132. While it is contemplated that the infant stimulation and learning apparatus 10 as implemented in the depiction of FIG. 6 may be so secured directly in an automobile seat, it is noted, as shown in FIG. 13, that the means for securing the infant stimulation and learning apparatus 10 in an automobile seat may further comprise utilization of an otherwise conventional infant car seat 131 to further ensure stability of the secured infant stimulation and learning apparatus 10.

Figure 14:
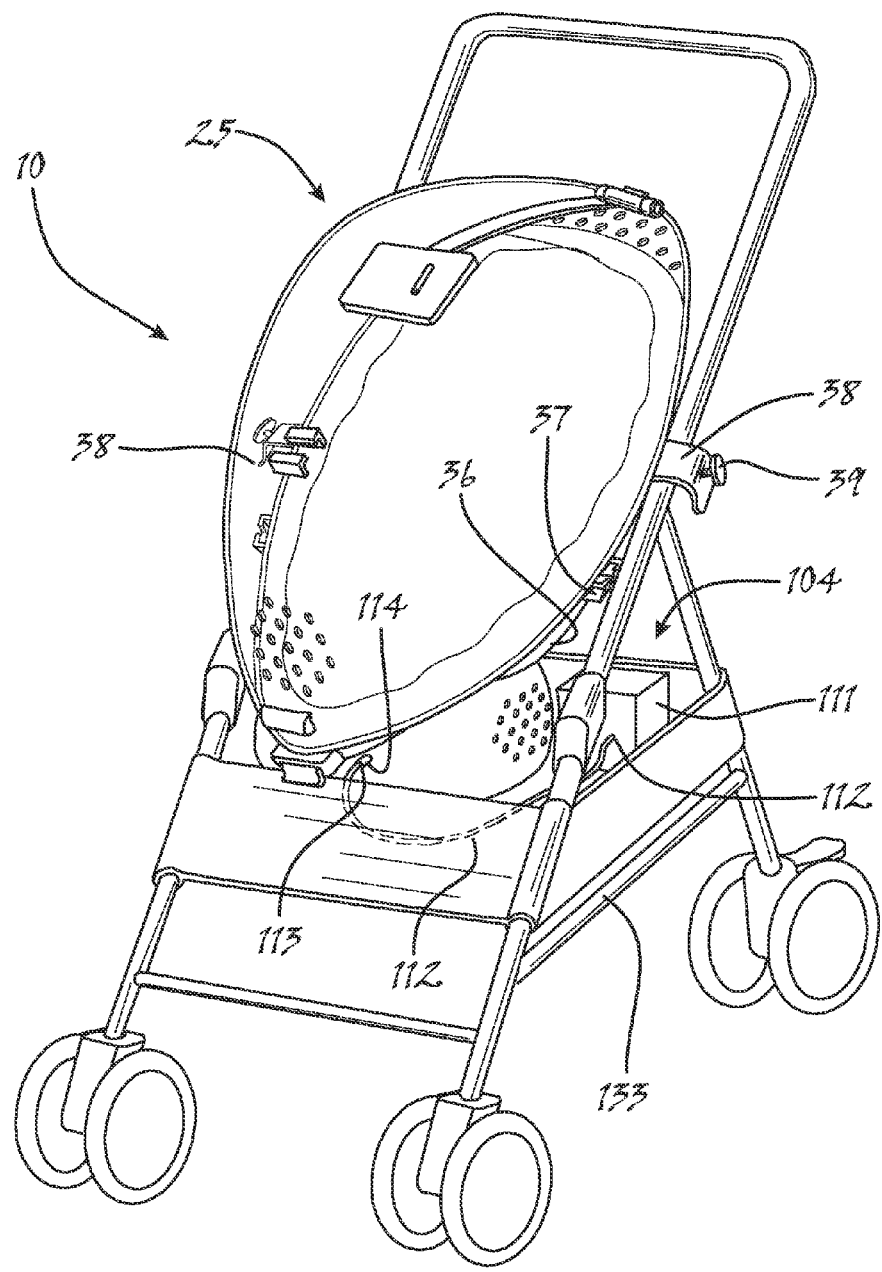
FIG. 14 shows, in a perspective view, various details of a means for securing an implementation of the infant stimulation and learning apparatus of the present invention in an infant stroller.

As particularly shown in FIG. 14, with reference also to the other figures, a means for securing the infant stimulation and learning apparatus 10 in an infant stroller 133 may comprise the provision of a stroller clamp 34, with associated thumbscrew 35, on the first side 32 of the bottom shell 27 of the infant carrier and a stroller clamp 38, with associated thumbscrew 39, on the second side 36 of the bottom shell 27 of the infant carrier. As shown in FIG. 14, these clamps 34, 38 thus disposed enable the ready attachment of the infant stimulation and learning apparatus 10 to a typical infant stroller 133.

As shown throughout the figures, the infant stimulation and learning apparatus 10 of the present invention also comprises an electrical power supply system 104, which power supply system 104 generally includes a power module 105, with an interface 110 for physically and electrically connecting the power module 105 to the rear end portion 21 of the environmental systems housing 16 or to the alternative environmental systems module 24, and one or more power cords 115. The power module 105 preferably includes a battery pack 106, such as is particularly advantageous for operation during power outages or in an implementation contemplating travel. To this end, the power module 105 also preferably comprises a battery charger 107 and a switching circuit 108. In any case, the power module 105 includes a power socket 109 for connection of one of the power cords 115.

In an alternative embodiment of the electrical power supply system 104, a power module 111 having generally the same functionality as does the previously described power module 105 may be implemented for use, in particular, in a "detached" configuration as may be desired in order to accommodate other features of the present invention such as, for example, mounting in an automobile seat or infant stroller, where space may be limited. As particularly shown in FIG. 14, such an alternative power module 111 will generally comprises, in lieu of the interface 110, a power cord 112 from the power module terminating in a power plug 113 adapted to interface with a receptacle 114 provided on the environmental systems housing 16 or the environmental systems module 24.

As shown in FIGS. 1 and 6, a plurality of power cords 115 is contemplated for use in connection with the present invention, depending on the particular manner of use. For example, a power cord 115 having a power plug 116 of the household power type 117 may also include a power adapter (e.g., convertor, transformer and/or the like) while a power cord 115 for use in an automobile may simply have a power plug 116 of the automobile "cigarette lighter" type 119 and not require any power adapter. In any case, each power cord 115 also comprises a module connector 120 adapted to interface the power cord 115 with the implemented power module 105, 111.

In use of the infant stimulation and learning apparatus 10 of the present invention, an infant is placed in the infant seat 41 and, if desired, secured in place with the infant restraint 44. If not previously activated, the air handler 84 of the fresh air circulation system 81 is the activated to ensure adequate airflow into and through the interior space 31 of the isolation device 25, after which the isolation canopy 61 is secured in the closed position. With the infant comfortably in place and isolated from distraction, the audio-visual display system 71 is activated to present the infant with focused stimulation and learning media. While the infant is receiving stimulating and educational content, the caregiver monitors the infant utilizing the integral environmental monitoring and control system, thereby ensuring that the infant remains in a positive and comfortable environment in furtherance of the objects of the present invention.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, the exemplary depictions of FIGS. 7 and 8 will bring to light that at least some implementations of the present invention also contemplates that the infant monitoring system 96 may double in use as an ordinary room monitor by operation of the infant monitoring system 96 with the isolation canopy 61 in its opened position. To this end, such implementations of the infant monitoring system also preferably comprise an attitude sensor 99 such as, for example, a mercury or like switch, for indicating to the system controller 102 that video is being captured "upside down." In this manner, the system controller 102 may be readily programmed to invert the captured video prior to transmission for viewing by a caregiver.

Additionally, those of ordinary skill in the art will recognize in light of this exemplary description that a hybrid implementation comprising features of both the most preferred implementation of FIGS. 1 through 5 and the alternatively preferred implementation of FIGS. 6 through 10 may be implemented. In particular, the present invention contemplates that a highly curved video screen 76 may be provided to substantially match the form and contour of the video projection screen 135 (to give the video screen 76 the shape of the overhead region 67 of the isolation canopy 61). In any case, because the scope of the present invention is much broader than any particular embodiment, the foregoing detailed description should not be construed as a limitation of the scope of the present invention, which is limited only by the claims appended hereto.

What is claimed is:

1. An infant stimulation and learning apparatus, said infant stimulation and learning apparatus comprising:
   an isolation device, said isolation device comprising an infant carrier and an isolation canopy affixed to said infant carrier, and wherein:
      said infant carrier comprises:
         an infant seat adapted to support an infant in a supine to semi-supine position; and
         a carrier support adapted to fix the position of said infant carrier; and
      said isolation canopy comprises:
         a ventilation hole;
         a curved overhead region extending substantially over and about said infant seat, thereby substantially enclosing said infant seat within an interior space of said isolation device; and
         an interior surface; and
   a visual display system, said visual system comprising:
      a video screen, said video screen being mounted, at said curved overhead region of said isolation canopy, to said interior surface of said isolation canopy and taking the general shape of said curved overhead region of said isolation canopy; and
      a media player, said media player being adapted to generate a visual display on said video screen.

2. The infant stimulation and learning apparatus as recited in claim 1, wherein:
   said video screen comprises a projection screen; and
   said media player comprises a projector adapted to project said visual display onto said projection screen.

3. The infant stimulation and learning apparatus as recited in claim 1, wherein said video screen comprises an electronic display device.

4. The infant stimulation and learning apparatus as recited in claim 1, wherein said isolation canopy is hingedly affixed to said infant carrier.

5. The infant stimulation and learning apparatus as recited in claim 1, visual display system further comprises an audio speaker, said audio speaker being disposed within said interior space of said isolation device.

6. An infant stimulation and learning apparatus, said infant stimulation and learning apparatus comprising:
   an isolation device, said isolation device comprising an infant carrier and an isolation canopy affixed to said infant carrier, and wherein:
      said infant carrier comprises:
         an infant seat adapted to support an infant in a supine to semi-supine position; and
         a carrier support adapted to fix the position of said infant carrier; and
      said isolation canopy comprises:
         a ventilation hole;
         a curved overhead region extending substantially over and about said infant seat, thereby substantially enclosing said infant seat within an interior space of said isolation device; and
         an interior surface; and
   an audio-visual display system, said audio-visual system comprising:
      a video screen, said video screen being mounted, at said curved overhead region of said isolation canopy, to said interior surface of said isolation canopy and taking the general shape of said curved overhead region of said isolation canopy;
      a media player, said media player being adapted to generate a visual display on said video screen; and
      a fresh air circulation system, said fresh air circulation system being adapted to pass air, taken from without said interior space of said isolation device, through said interior space of said isolation device.

7. The infant stimulation and learning apparatus as recited in claim 6, wherein:
   said video screen comprises a projection screen; and
   said media player comprises a projector adapted to project said visual display onto said projection screen.

8. The infant stimulation and learning apparatus as recited in claim 6, wherein said video screen comprises an electronic display device.

9. The infant stimulation and learning apparatus as recited in claim 6, wherein said isolation canopy is hingedly affixed to said infant carrier.

10. An infant stimulation and learning apparatus, said infant stimulation and learning apparatus comprising:
   an isolation device, said isolation device comprising an infant carrier and an isolation canopy affixed to said infant carrier, and wherein:
      said infant carrier comprises:
         an infant seat adapted to support an infant in a supine to semi-supine position; and
         a carrier support adapted to fix the position of said infant carrier; and
      said isolation canopy comprises:
         a ventilation hole;
         an overhead region extending substantially over and about said infant seat, thereby substantially enclosing said infant seat within an interior space of said isolation device; and
         an interior surface;
   an audio-visual display system, said audio-visual system comprising:

a video screen, said video screen being mounted, at said curved overhead region of said isolation canopy, to said interior surface of said isolation canopy and taking the general shape of said curved overhead region of said isolation canopy;

an audio speaker, said audio speaker being disposed within said interior space of said isolation device; and a media player, said media player being adapted to generate a visual display on said video screen and an audio output through said audio speaker; and an infant monitoring system, said infant monitoring system comprising:

a monitoring device, said monitoring device being disposed within said interior space of said isolation device and adapted and arranged to monitor the state of an infant supported by said infant seat; and a signals transceiver, said signals transceiver being adapted to transmit, to a location remote from said isolation device, signals embodying the state of the infant supported by said infant seat as monitored by said monitoring device.

11. The infant stimulation and learning apparatus as recited in claim 10, wherein:

said monitoring device comprises an imaging device, said imaging device being disposed within said interior space of said isolation device and adapted and arranged to capture video imagery of an infant supported by said infant seat; and said signals transceiver is adapted to transmit, to a location remote from said isolation device, signals embodying video imagery captured by said imaging device.

12. The infant stimulation and learning apparatus as recited in claim 11, wherein said infant monitoring system further comprises an attitude sensor adapted to indicate inverted capture of video.

13. The infant stimulation and learning apparatus as recited in claim 10, wherein:

said monitoring device comprises a microphone, said microphone being disposed within said interior space of said isolation device and adapted and arranged to capture sound generated within said interior space of said isolation device; and said signals transceiver is adapted to transmit, to a location remote from said isolation device, signals embodying sounds captured by said microphone.

14. The infant stimulation and learning apparatus as recited in claim 10, wherein:

said monitoring device comprises a temperature transducer, said temperature transducer being disposed within said interior space of said isolation device and adapted and arranged to measure the temperature of said interior space of said isolation device; and said signals transceiver is adapted to transmit, to a location remote from said isolation device, signals embodying temperatures measured by said temperature transducer.

15. The infant stimulation and learning apparatus as recited in claim 10, wherein:

said infant monitoring system comprises a plurality of monitoring devices, each said monitoring device being disposed within said interior space of said isolation device and adapted and arranged to monitor the state of an infant supported by said infant seat; and wherein said signals transceiver is adapted to transmit, to a location remote from said isolation device, signals embodying the state of the infant supported by said infant seat as monitored by each said monitoring device.

16. The infant stimulation and learning apparatus as recited in claim 15, wherein:

said infant monitoring system comprises:

an imaging device, said imaging device being disposed within said interior space of said isolation device and adapted and arranged to capture video imagery of an infant supported by said infant seat;

a microphone, said microphone being disposed within said interior space of said isolation device and adapted and arranged to capture sound generated within said interior space of said isolation device; and a temperature transducer, said temperature transducer being disposed within said interior space of said isolation device and adapted and arranged to measure the temperature of said interior space of said isolation device; and said signals transceiver is adapted to transmit, to a location remote from said isolation device, signals embodying video imagery captured by said imaging device, sounds captured by said microphone and temperatures measured by said temperature transducer.

17. The infant stimulation and learning apparatus as recited in claim 16, wherein said infant monitoring system further comprises an attitude sensor adapted to indicate inverted capture of video.

18. The infant stimulation and learning apparatus as recited in claim 10, wherein:

said video screen comprises a projection screen; and said media player comprises a projector adapted to project said visual display onto said projection screen.

19. The infant stimulation and learning apparatus as recited in claim 10, wherein said video screen comprises an electronic display device.

20. The infant stimulation and learning apparatus as recited in claim 10, wherein said isolation canopy is hingedly affixed to said infant carrier.

21. An infant stimulation and learning apparatus, said infant stimulation and learning apparatus comprising:

an isolation device, said isolation device comprising an infant carrier and an isolation canopy hingedly affixed to said infant carrier, and wherein:

said infant carrier comprises:

an infant seat adapted to support an infant in a supine to semi-supine position; and a carrier support adapted to fix the position of said infant carrier; and said isolation canopy comprises:

a curved overhead region extending substantially over and about said infant seat, thereby substantially enclosing said infant seat within an interior space of said isolation device; and an interior surface; and a visual display system, said visual system comprising:

a video screen, said video screen being mounted, at said curved overhead region of said isolation canopy, to said interior surface of said isolation canopy and taking the general shape of said curved overhead region of said isolation canopy; and a media player, said media player being adapted to generate a visual display on said video screen.

22. The infant stimulation and learning apparatus as recited in claim 21, wherein:

said video screen comprises a projection screen; and said media player comprises a projector adapted to project said visual display onto said projection screen.

23. The infant stimulation and learning apparatus as recited in claim 21, wherein said video screen comprises an electronic display device.

24. The infant stimulation and learning apparatus as recited in claim 21, visual display system further comprises an audio speaker, said audio speaker being disposed within said interior space of said isolation device.

25. An infant stimulation and learning apparatus, said infant stimulation and learning apparatus comprising:
 an isolation device, said isolation device comprising an infant carrier and an isolation canopy hingedly affixed to said infant carrier, and wherein:
  said infant carrier comprises:
   an infant seat adapted to support an infant in a supine to semi-supine position; and
   a carrier support adapted to fix the position of said infant carrier; and
  said isolation canopy comprises:
   a curved overhead region extending substantially over and about said infant seat, thereby substantially enclosing said infant seat within an interior space of said isolation device; and
   an interior surface; and
 an audio-visual display system, said audio-visual system comprising:
  a video screen, said video screen being mounted, at said curved overhead region of said isolation canopy, to said interior surface of said isolation canopy and taking the general shape of said curved overhead region of said isolation canopy;
  a media player, said media player being adapted to generate a visual display on said video screen; and
  a fresh air circulation system, said fresh air circulation system being adapted to pass air, taken from without said interior space of said isolation device, through said interior space of said isolation device.

26. The infant stimulation and learning apparatus as recited in claim 25, wherein:
 said video screen comprises a projection screen; and
 said media player comprises a projector adapted to project said visual display onto said projection screen.

27. The infant stimulation and learning apparatus as recited in claim 25, wherein said video screen comprises an electronic display device.

28. An infant stimulation and learning apparatus, said infant stimulation and learning apparatus comprising:
 an isolation device, said isolation device comprising an infant carrier and an isolation canopy hingedly affixed to said infant carrier, and wherein:
  said infant carrier comprises:
   an infant seat adapted to support an infant in a supine to semi-supine position; and
   a carrier support adapted to fix the position of said infant carrier; and
  said isolation canopy comprises:
   an overhead region extending substantially over and about said infant seat, thereby substantially enclosing said infant seat within an interior space of said isolation device; and
   an interior surface; and
 an audio-visual display system, said audio-visual system comprising:
  a video screen, said video screen being mounted, at said curved overhead region of said isolation canopy, to said interior surface of said isolation canopy and taking the general shape of said curved overhead region of said isolation canopy;
  an audio speaker, said audio speaker being disposed within said interior space of said isolation device; and
  a media player, said media player being adapted to generate a visual display on said video screen and an audio output through said audio speaker; and
 an infant monitoring system, said infant monitoring system comprising:
  a monitoring device, said monitoring device being disposed within said interior space of said isolation device and adapted and arranged to monitor the state of an infant supported by said infant seat; and
  a signals transceiver, said signals transceiver being adapted to transmit, to a location remote from said isolation device, signals embodying the state of the infant supported by said infant seat as monitored by said monitoring device.

29. The infant stimulation and learning apparatus as recited in claim 28, wherein:
 said monitoring device comprises an imaging device, said imaging device being disposed within said interior space of said isolation device and adapted and arranged to capture video imagery of an infant supported by said infant seat; and
 said signals transceiver is adapted to transmit, to a location remote from said isolation device, signals embodying video imagery captured by said imaging device.

30. The infant stimulation and learning apparatus as recited in claim 29, wherein said infant monitoring system further comprises an attitude sensor adapted to indicate inverted capture of video.

31. The infant stimulation and learning apparatus as recited in claim 28, wherein:
 said monitoring device comprises a microphone, said microphone being disposed within said interior space of said isolation device and adapted and arranged to capture sound generated within said interior space of said isolation device; and
 said signals transceiver is adapted to transmit, to a location remote from said isolation device, signals embodying sounds captured by said microphone.

32. The infant stimulation and learning apparatus as recited in claim 28, wherein:
 said monitoring device comprises a temperature transducer, said temperature transducer being disposed within said interior space of said isolation device and adapted and arranged to measure the temperature of said interior space of said isolation device; and
 said signals transceiver is adapted to transmit, to a location remote from said isolation device, signals embodying temperatures measured by said temperature transducer.

33. The infant stimulation and learning apparatus as recited in claim 28, wherein:
 said infant monitoring system comprises a plurality of monitoring devices, each said monitoring device being disposed within said interior space of said isolation device and adapted and arranged to monitor the state of an infant supported by said infant seat; and
 wherein said signals transceiver is adapted to transmit, to a location remote from said isolation device, signals embodying the state of the infant supported by said infant seat as monitored by each said monitoring device.

34. The infant stimulation and learning apparatus as recited in claim 33, wherein:
 said infant monitoring system comprises:
  an imaging device, said imaging device being disposed within said interior space of said isolation device and adapted and arranged to capture video imagery of an infant supported by said infant seat;

a microphone, said microphone being disposed within said interior space of said isolation device and adapted and arranged to capture sound generated within said interior space of said isolation device; and a temperature transducer, said temperature transducer being disposed within said interior space of said isolation device and adapted and arranged to measure the temperature of said interior space of said isolation device; and said signals transceiver is adapted to transmit, to a location remote from said isolation device, signals embodying video imagery captured by said imaging device, sounds captured by said microphone and temperatures measured by said temperature transducer.

35. The infant stimulation and learning apparatus as recited in claim 34, wherein said infant monitoring system further comprises an attitude sensor adapted to indicate inverted capture of video.

36. The infant stimulation and learning apparatus as recited in claim 28, wherein:

said video screen comprises a projection screen; and said media player comprises a projector adapted to project said visual display onto said projection screen.

37. The infant stimulation and learning apparatus as recited in claim 28, wherein said video screen comprises an electronic display device.

* * * * *